United States Patent
Kleveland (10) Patent No.: US 7,759,916 B2
(45) Date of Patent: Jul. 20, 2010

(54) REGULATOR WITH DEVICE PERFORMANCE DYNAMIC MODE SELECTION

(75) Inventor: Bendik Kleveland, Santa Clara, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 145 days.

(21) Appl. No.: 12/118,773

(22) Filed: May 12, 2008

(65) Prior Publication Data

US 2009/0278517 A1 Nov. 12, 2009

(51) Int. Cl.
*G05F 1/00* (2006.01)
*G06F 1/00* (2006.01)

(52) U.S. Cl. ...................... 323/268; 713/310

(58) Field of Classification Search ............... 323/268, 323/269, 272, 283, 285; 713/300, 310, 320
See application file for complete search history.

(56) References Cited

U.S. PATENT DOCUMENTS

| | | | |
|---|---|---|---|
| 4,502,152 A * | 2/1985 | Sinclair | 455/73 |
| 5,034,676 A | 7/1991 | Kinzalow | |
| 5,258,701 A * | 11/1993 | Pizzi et al. | 323/269 |
| 5,309,082 A | 5/1994 | Payne | |
| 5,502,369 A | 3/1996 | Niwayama | |
| 5,773,966 A | 6/1998 | Steigerwald | |
| 5,998,977 A * | 12/1999 | Hsu et al. | 323/272 |
| 6,150,798 A | 11/2000 | Ferry et al. | |
| 6,424,128 B1 | 7/2002 | Hiraki et al. | |
| 6,597,158 B2 | 7/2003 | Umeda | |
| 6,636,023 B1 * | 10/2003 | Amin | 323/268 |
| 6,815,935 B2 * | 11/2004 | Fujii | 323/272 |
| 7,064,531 B1 | 6/2006 | Zinn | |
| 7,084,612 B2 | 8/2006 | Zinn | |
| 7,190,150 B2 | 3/2007 | Chen et al. | |
| 7,402,986 B2 * | 7/2008 | Frith et al. | 323/282 |
| 7,421,593 B2 * | 9/2008 | Koertzen | 713/300 |
| 7,436,159 B1 * | 10/2008 | Wochele | 323/273 |
| 7,499,682 B2 * | 3/2009 | Rozenblit et al. | 455/127.3 |

OTHER PUBLICATIONS

Williams, "Minimizing Switching Regulator Residue in Linear Regulator Outputs," Linear Technology, Application Note 101, Jul. 2005.
Grebne, "Bipolar and MOS Analog Integrated Circuit Design," John Wiley & Sons, Inc., 1984, pp. 482-489, 514-519, 521-523, 527-528.

* cited by examiner

*Primary Examiner*—Shawn Riley
(74) *Attorney, Agent, or Firm*—King & Spalding L.L.P.

(57) ABSTRACT

A voltage regulator device and accompanying methods are provided for providing efficient voltage regulation to an electronic device. Efficient regulator 400 receives an input voltage on $V_{IN}$ from a battery or some other power supply at node $V_{IN}$ and supplies a stable regulated voltage to load device 404 at node $V_{OUT}$. Load device 404 pulls different amounts of current and requires different degrees of tolerance on the voltage at $V_{OUT}$ depending upon its operating conditions. Data collection and control circuit 401 is capable of enabling and disabling regulator 402 and regulator 403. Data collection and control circuit 401 is also capable of measuring certain performance parameters associated with load device 404 and the operating conditions of load device 404. Data collection and control circuit 401 enables regulator 402 if said operating conditions are such that when data collection and control circuit 401 enables regulator 403 the performance parameters associated with load 404 are below a predefined standard.

20 Claims, 6 Drawing Sheets

REGULATOR WITH DEVICE PERFORMANCE DYNAMIC MODE SELECTION

FIELD OF THE INVENTION

The invention relates generally to voltage regulator circuits, and more specifically to maximizing the efficiency of voltage regulator circuits.

BACKGROUND OF THE INVENTION

The continuing integration of portable electronics into daily life and the benefits to society thereof have been dependent on increasing both the performance and portability of electronic systems. These requirements conflict because the underlying integrated circuits (ICs) that enable electronic devices require greater amounts of power to provide a greater degree of functionality and accuracy. Digital circuits consume more power with greater functionality because they require more devices that burn additional current while switching. Analog circuits require more power to perform with greater accuracy because larger voltage and current signals are less susceptible to noise and manufacturing asymmetries. Electronic circuits in general consume more power when required to perform faster. The power and performance tradeoff that is inherent in ICs creates an acute design challenge in the field of portable electronics.

Voltage regulators are a particular kind of circuit that is necessary for the functionality of portable electronics. Portable electronic devices are powered by batteries with voltages that differ from the voltages required by the device's ICs. For example, a battery cell voltage for a mobile phone could be 3.6V while the microprocessor IC of the mobile phone might require a 1.8V supply voltage. A voltage regulator is used to take in the battery voltage of the device as an input voltage and output the supply voltage to the IC. The IC is often referred to as the load of the regulator. Voltage regulators are also called DC to DC converters owing to the fact that they convert one DC voltage to another.

Ideal voltage regulators supply the same voltage regardless of the current drawn by the load IC. In addition, an ideal voltage regulator does not consume any power and provides a clean output voltage to the IC. The two most common types of voltage regulators are switching regulators and linear regulators. Linear regulators are also referred to as series regulators or low-dropout (LDO) regulators in reference to their most common configuration. Switching regulators are sometimes referred to as pulse-width modulated (PWM) regulators or buck regulators in reference to a common switching regulator architecture. Switching regulators introduce variation to the output voltage but are generally very power efficient. Linear regulators provide a clean output voltage but can be very inefficient under certain operating conditions.

Figure 1:
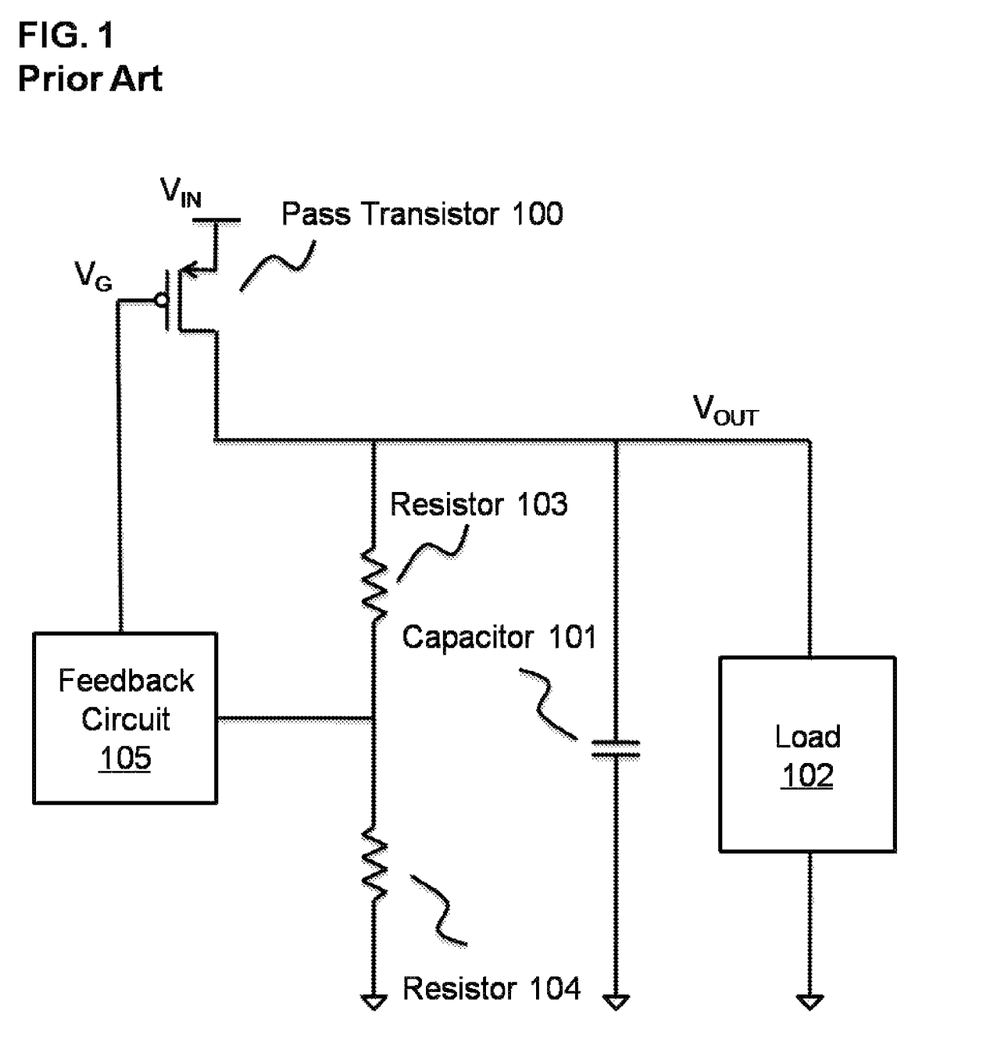
FIG. 1 illustrates a typical linear voltage regulator.

The operation of a linear regulator can be explained with reference to FIG. 1. In FIG. 1, the voltage $V_{IN}$ is the input voltage and $V_{OUT}$ is the output voltage. In this particular example, the regulator is a step-down voltage regulator as $V_{OUT}$ has a lower potential than $V_{IN}$. Capacitor 101 is placed across load 102 to provide stability to the system. Load 102 will draw varying amounts of current depending upon its state. The feedback network formed by resistors 103 and 104 and feedback circuit 105 will alter the voltage at $V_G$ to keep $V_{OUT}$ at the target voltage. If load 102 suddenly drew more current, the feedback network would lower the voltage at $V_G$ and more current would flow through pass transistor 100 to compensate for the additional load current. The same process would occur in reverse if load 102 suddenly drew less current.

The linear voltage regulator does not introduce any additional variation to the regulated voltage, but it can consume a significant amount of power. The current through pass transistor 100 is controlled by a continuous feedback signal so no additional variation is added to the voltage on $V_{OUT}$ by the linear voltage regulator. However, since the voltage drop from $V_{IN}$ to $V_{OUT}$ is placed across transistor 100, energy is dissipated as heat in proportion to the voltage across the transistor. Neglecting the power consumption associated with the feedback loop, the efficiency equation for the linear voltage regulator in FIG. 1 is:

$$\eta = V_{OUT}/V_{IN}$$

Using the numbers associated with the previous example of the mobile phone battery and microprocessor, the best possible efficiency a linear regulator could achieve would be 50%.

Figure 2:
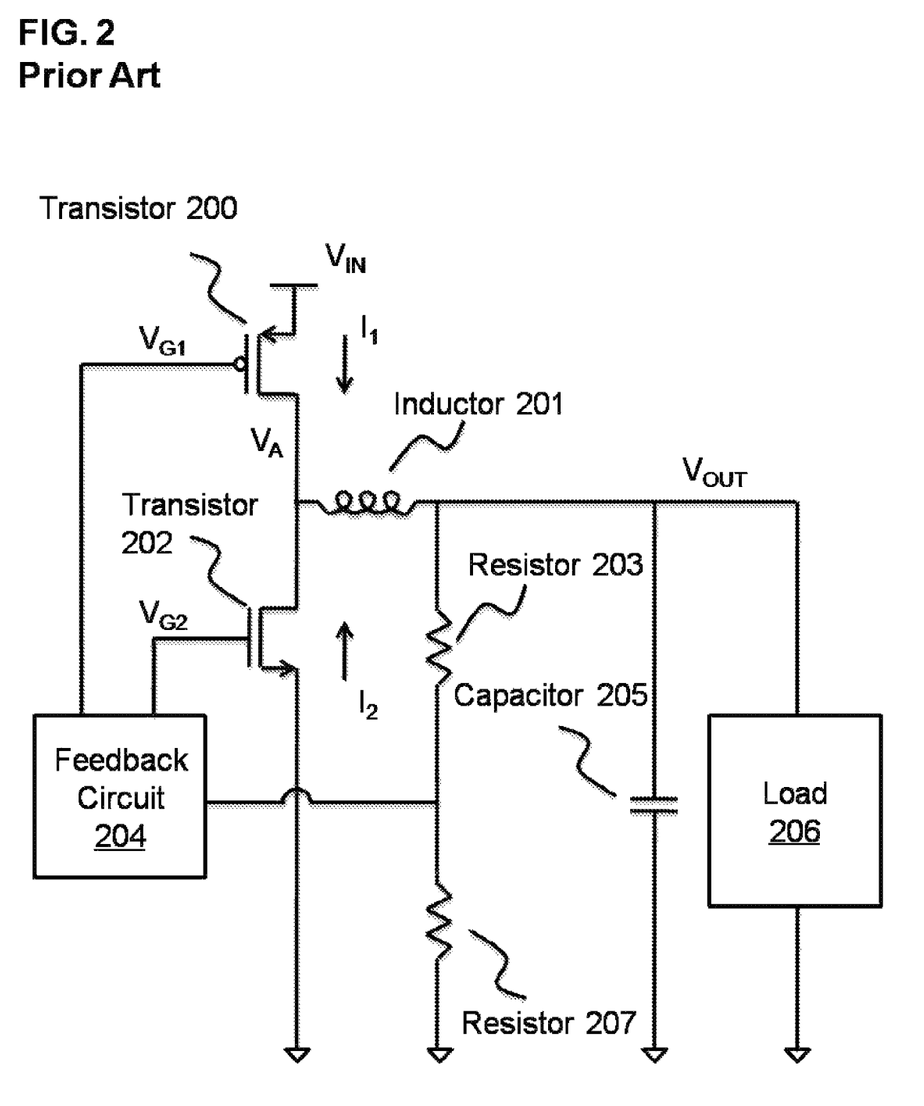
FIG. 2 illustrates a typical switching voltage regulator.
Figure 3:
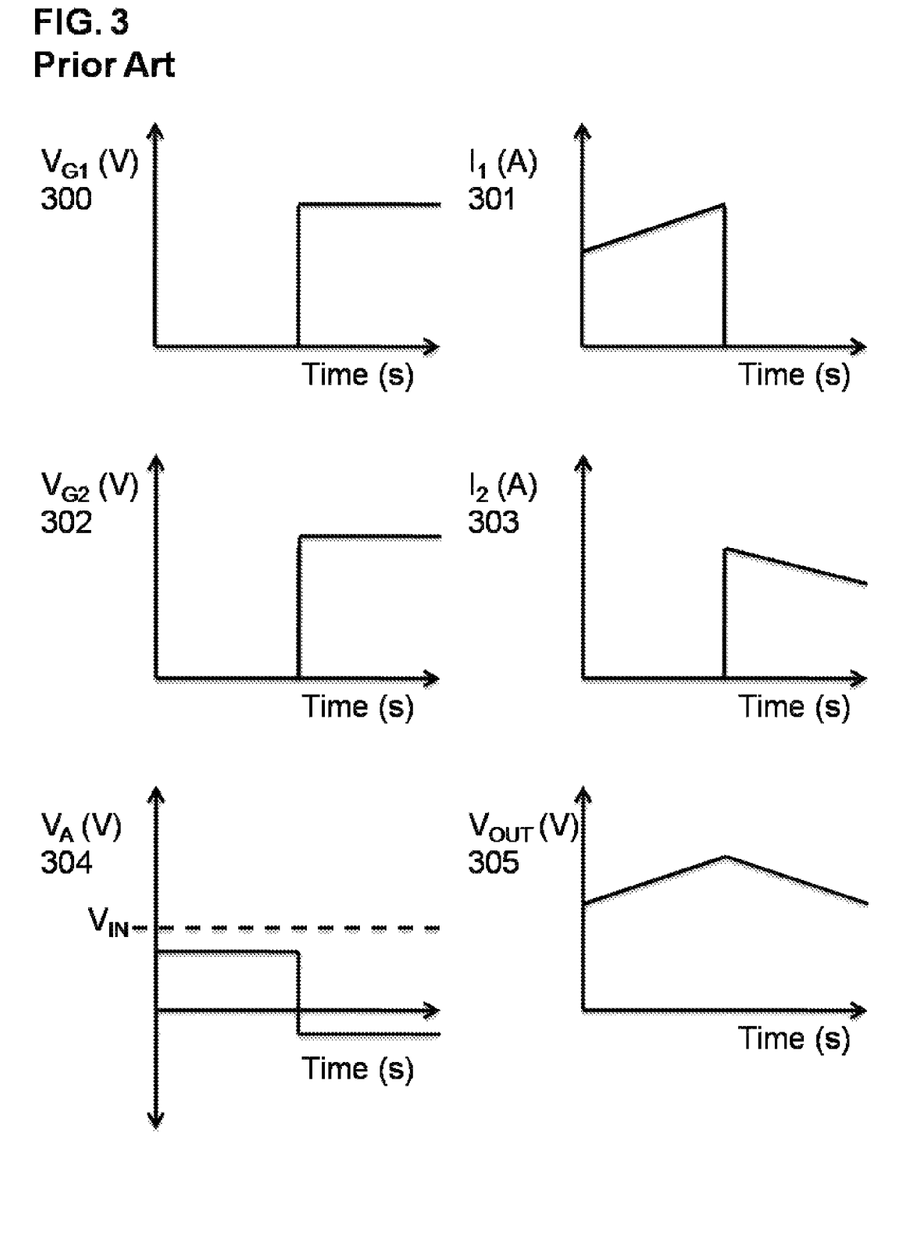
FIG. 3 illustrates waveforms for specific currents and voltages in one cycle of operation for a switching voltage regulator.

The operation of a switching regulator can be explained with reference to the circuit in FIG. 2 and the waveforms in FIG. 3. In FIG. 2 the voltage $V_{IN}$ is the input voltage and the voltage $V_{OUT}$ is the output voltage. Feedback circuit 204 receives a voltage related to $V_{OUT}$ from the resistor network comprised of resistors 203 and 207. Based on the received signal, feedback circuit 204 sends alternating signal to nodes $V_{G1}$ and $V_{G2}$ such that either transistor 200 or 202 is on and the other is off. The voltages at $V_{G1}$ can be seen on axis 300 and the voltage at $V_{G2}$ can be seen on axis 302. Current $I_1$, which flows through transistor 200, is shown on axis 301 and current $I_2$, which flows through transistor 202, is shown on axis 303. The voltage at node $V_A$ is shown on axis 304 and the voltage at node $V_{OUT}$ is shown on axis 305.

A switching voltage regulator is continuously altering between two phases as the switching signal turns on either transistor 200 or transistor 202. The first phase begins when $V_{G1}$ and $V_{G2}$ are set to low. At the time just before $V_{G1}$ is set to a low value and transistor 200 is switched on, the minimum current for a given load condition is flowing through inductor 201. Once the voltage at $V_{G1}$ is set to a low value inductor 201 will continue to pull the same minimum current from $V_{IN}$ through transistor 200. The current will flow through inductor 201 to capacitor 205 and load 206. The current through inductor 201 will build slightly during this phase as the voltage potential across the inductor will be in the same direction as the current flow. This increase in current will charge capacitor 205 and will then begin to supply more current than load 206 requires. At this point, feedback circuit 204 will switch the regulator into its second phase.

In the second phase, both $V_{G1}$ and $V_{G2}$ will be set to a high value such that transistor 200 is off and transistor 202 is on. When the regulator switches, the current through inductor 201 will be at its maximum for a given load condition. Inductor 201 will continue to pull the same maximum current because of the stored electromotive force (EMF) in the inductor. This force will push node $V_A$ down to below ground potential and charge will flow from ground through transistor 202 to node $V_A$. Since the voltage potential across the inductor will be in the opposite direction of the current flow, the EMF in the inductor will dissipate during this phase. The current through inductor 201 will decrease until the regulator is supplying slightly less current than load 206 requires. At such time the system will switch back to the first phase.

The switching regulator introduces a certain degree of variation in the regulated voltage but it consumes relatively little power. The reason switching regulators are so efficient can be explained with reference again to FIG. 2 and FIG. 3. As shown on axis 304, the voltage drop across transistors 200 and 202 is very low while either transistor is conducting. The main voltage drop from $V_{IN}$ to $V_{OUT}$ is applied across the inductor where it is stored by generating EMF as opposed to being applied across a transistor and dissipated as heat. Neglecting the power consumption associated with the feedback circuitry, the efficiency of a switched voltage regulator can be around 95%. However, as mentioned previously, the switching action of the transistors produces variations in the output voltage. An example of this variation is shown on axis 305.

If the power consumption of the regulator's control and feedback circuitry is taken into account, the switching regulator's efficiency advantage is diminished. A switching regulators feedback circuitry must charge and discharge the gates of the switching transistors continuously and uses a power hungry feedback circuit whereas the power consumption in a linear regulator's feedback circuitry consists mainly of a single amplifier. In general, the linear regulator's feedback circuitry does not consume as much power as that of a switching regulator. Since the control circuitry of both regulators is not directly dependent on the output current, when the load current of a regulator decreases a switching regulator loses its efficiency advantage.

The tradeoffs associated with linear and switching regulators have led to many approaches that synergize the two designs. For example, U.S. Pat. No. 5,309,082 to Payne uses a linear regulator and switching regulator in cascade to take advantage of the benefits of the two regulator types while masking the low efficiency of a stand-alone linear regulator. U.S. Pat. No. 7,084,612 to Zinn uses a switching regulator and linear regulator in series to provide an advantageous mix of the two regulator's characteristics. In addition, there is a large body of patents that focus on combining aspects of linear and switching regulators by operating the two types of regulators in parallel or operating them individually based on the current drawn by the load.

A linear and switching regulator can be operated in parallel to form a single regulator in order to take advantage of the speed superiority of a linear regulator and the power efficiency of a switching regulator. In U.S. Pat. No. 5,258,701 to Pizzi and U.S. Pat. No. 6,636,023 to Amin, a linear regulator and switching regulator are placed in parallel but the linear regulator only turns on when the output voltage drops below a certain threshold that is lower than the target regulated voltage. In such a circuit the linear regulator only turns on when the regulated voltage has varied wildly and the speed of the linear regulator is required to correct the variation quickly. When the load is stable, the linear regulator will turn off and the highly efficient switching regulator will regulate the output voltage so the overall efficiency of the combined regulator is maximized. U.S. Pat. No. 6,661,211 to Currelly is similar in that the linear regulator is only active during circuit start-up when the linear regulators speed is required.

A single regulator comprised of a parallel linear and voltage regulator can also mask the dramatic decrease in efficiency caused by an increase in the voltage drop from the input to output voltage. For example, U.S. Pat. No. 6,150,798 to Ferry describes a voltage regulator system containing both a switching and linear voltage regulator and a control circuit that switches between the two regulators based on the differential between the input and output voltages. For small differentials the linear regulator is applied to regulate the voltage and at large differentials the linear regulator is turned off and a switching regulator is applied. This is advantageous from a power optimization perspective because the efficiency of the linear regulator is directly related to this differential. The linear voltage regulator and its clean output voltage can be applied until doing so would waste too much power. U.S. Pat. No. 7,190,150 to Chen applies a similar principle for regulating the voltage applied to power amplifiers.

Another family of circuits that utilize linear and switching regulators in parallel addresses the decreased efficiency of switching regulators at low load currents. U.S. Pat. No. 6,597,158 to Umeda and U.S. Pat. No. 5,773,966 to Steigerwald describe a voltage regulator that operates in switch mode for high load currents and changes to a linear regulator when a measurement and control circuit detects a decrease in the load current past a certain level. U.S. Pat. No. 6,424,128 to Hiraki et al. uses a similar method but allows for the use of multiple linear regulators. U.S. Pat. No. 7,064,531 to Zinn builds on the general idea of this family of circuits by using a linear regulator with a relatively small pass element compared to the switching regulator's pass transistors. As such, the low load current efficiency of the linear regulator is improved to an even greater degree because the feedback and control circuitry needs to supply less charge to the lower capacitance associated with the smaller device. There are other circuits known in the art that transition between the low current linear regulator states to high current switching regulator states automatically based on the output current. Instead of monitoring the output current with control circuitry, these circuits are designed such that the linear regulator turns off automatically as the load current increases. U.S. Pat. No. 4,502,152 to Sinclair and U.S. Pat. No. 5,034,676 to Kinzalow are examples of this kind of circuit.

Circuits are known in the art that apply either a linear or switching regulator configuration based on the operating mode of the load they are regulating. For example, U.S. Pat. No. 6,815,935 to Fujii takes advantage of the lower output current power consumption superiority of a linear regulator by applying a linear voltage regulator to the load when its regulated device is in a standby mode and applying a switching voltage regulator when the load is in its basic operational mode. This approach is similar to that implemented by Umeda but it selects between the two regulators based on an input signal that controls the operating state of the load instead of one that is generated by measuring the operating state of the load.

Another design that utilizes switching and linear voltage regulators in parallel and applies them based on the operating condition of the load is described in U.S. Pat. No. 5,502,369 to Niwayama. The patent describes a voltage regulator that supplies a voltage to a device based on the operating mode of the device. The voltage regulator will apply either a switching or linear regulator output to the device depending upon the regulated device's operating mode. For example, when a CD player is operating normally a linear regulator is applied to regulate the supply. Contrarily, when the CD player is ejecting a disc and requires a relatively large amount of power, a switching regulator output is supplied to the CD player. As such, the circuit applies the proper type of regulator based on the needs of the load device. When the device is in a mode in which a large amount of power is required but supply stability and accuracy are not important, a switching regulator is applied. When the device is in a mode that uses a smaller amount of power but accuracy is very important, a linear regulator is applied.

SUMMARY OF INVENTION

In one aspect of the invention, a voltage regulator with dynamic mode selection for providing efficient voltage regulation to an electronic device is provided. A first voltage regulator is coupled to the electronic device and is also coupled to a power supply. Likewise, a second voltage regulator is also coupled to the electronic device and the power supply. The voltage regulator with dynamic mode selection also includes a data collection and control circuit capable of measuring operating conditions and performance parameters of the electronic device. The data collection and control circuit enables said first voltage regulator if said operating conditions are such that when said data collection and control circuit enables said second voltage regulator said performance parameters fall below a predefined standard.

In another aspect of the invention, a method for providing efficient voltage regulation to an electronic device is provided. First, a voltage regulator in a switching regulator mode regulates a supply voltage applied to the electronic device. Next, a data collection and control circuit measures performance parameters of said electronic device while the electronic device is in an operating state. Then, if the performance parameters fail a predefined standard, the voltage regulator is switched to a linear regulator mode to regulate the supply voltage applied to the electronic device. If instead the performance parameters exceed the predefined standard, the voltage regulator is maintained in the switching regulator mode.

In another aspect of the invention, a method for providing power optimized voltage regulation to an electronic device is provided. First, a voltage regulator in either a linear regulator or switching regulator mode regulates the supply voltage applied to the electronic device. Next the operating conditions of the electronic device are measured. If the measured operating conditions are stored in an operating condition storage matrix with a stored mode, the voltage regulator is set in the mode corresponding to the stored mode. If said operating conditions are not stored in the operating condition storage matrix, the voltage regulator is calibrated by measuring performance parameters of the electronic device while the voltage regulator is in the switching regulator mode. Also, if said operating conditions are not stored in the operating condition storage matrix, a switching regulator mode selection code is stored as a stored mode corresponding to the operating conditions if the performance parameters pass a predefined standard. Finally, if said operating conditions are not stored in the operating condition storage matrix, a linear regulator mode selection code is stored as a stored mode corresponding to the operating conditions if the performance parameters fail a predefined standard.

DETAILED DESCRIPTION OF THE PREFERRED EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used on another embodiment to yield a still further embodiment. Thus, it is intended that the present subject matter covers such modifications and variations as come within the scope of the appended claims and their equivalents.

The present invention provides efficient voltage regulation to an electronic device. In one embodiment of the invention a voltage regulator that is capable of operating in a switching regulator or linear regulator mode is used to regulate the voltage applied to a load device. The regulator operates in a switching regulator mode as a default and operates in a linear regulator mode when the ripple introduced by the switching regulator impedes the performance of the load device to an unacceptable degree. As such, the regulator operates for a majority of the time in a switching regulator mode to save power and operates in a linear regulator mode only when necessary. The dynamic selection of either a switching or linear regulator mode therefore allows the device to only receive the linear regulator voltage when it would otherwise not perform as desired. For example, a voltage regulator providing a supply voltage to a cellular telephone could operate in a linear mode while the cellular telephone was receiving a weak signal and needed to perform high accuracy analog measurement and could otherwise save power by operating in a switching regulator mode.

An exemplary embodiment of the present invention can be explained with reference to FIG. 4. Efficient regulator 400 receives an input voltage on $V_{IN}$ from a battery or some other power supply at node $V_{IN}$ and supplies a stable regulated voltage to load device 404 at node $V_{OUT}$. Load device 404 pulls different amounts of current and requires different degrees of tolerance on the voltage at $V_{OUT}$ depending upon its operating conditions. Data collection and control circuit 401 is capable of enabling and disabling regulator 402 and regulator 403. In this exemplary embodiment, regulator 402 is a linear regulator and regulator 403 is a switching regulator. Data collection and control circuit 401 is also capable of measuring certain performance parameters associated with load device 404 and the operating conditions of load device 404. For a given set of operating conditions, data collection and control circuit 401 is capable of detecting the performance parameters of load 404 with regulator 403 enabled and regulator 402 disabled. Alternatively, data collection and control circuit 401 could also be capable of detecting the performance parameters of load 404 with regulator 402 enabled and regulator 403 disabled.

The dynamic mode selection of the present invention can be embodied in many forms. A basic embodiment of dynamic mode selection can be explained with reference to the flowchart illustrated in FIG. 5. In accordance with this embodiment, the voltage regulator for a given electronic device would operate in the switching mode to preserve power in step 500. The switching mode would be the default mode of the regulator and the regulated voltage would contain a cyclic time varying element produced by the switching regulator's normal behavior. Periodically, the performance of the regulated device and the voltage regulator itself would be monitored. This could be done at set periodic times such as once every millisecond or it could be done in response to a change in the operating state of the device such as when the device acted as an analog sensor and needed to measure a signal. The performance would be monitored by measuring certain performance parameters such as the degree of variation on the regulated voltage or, in the case of a transmitter device, the number of packet errors per unit of time. The measurement of such parameters and their comparison with pre-determined thresholds would occur in step 501. If the performance parameters indicated satisfactory performance the regulator would remain in the switching mode. If the performance parameters indicated unsatisfactory performance the regulator would transfer to step 502 and change to a linear regulator mode so that the performance parameters would improve.

Figure 5:
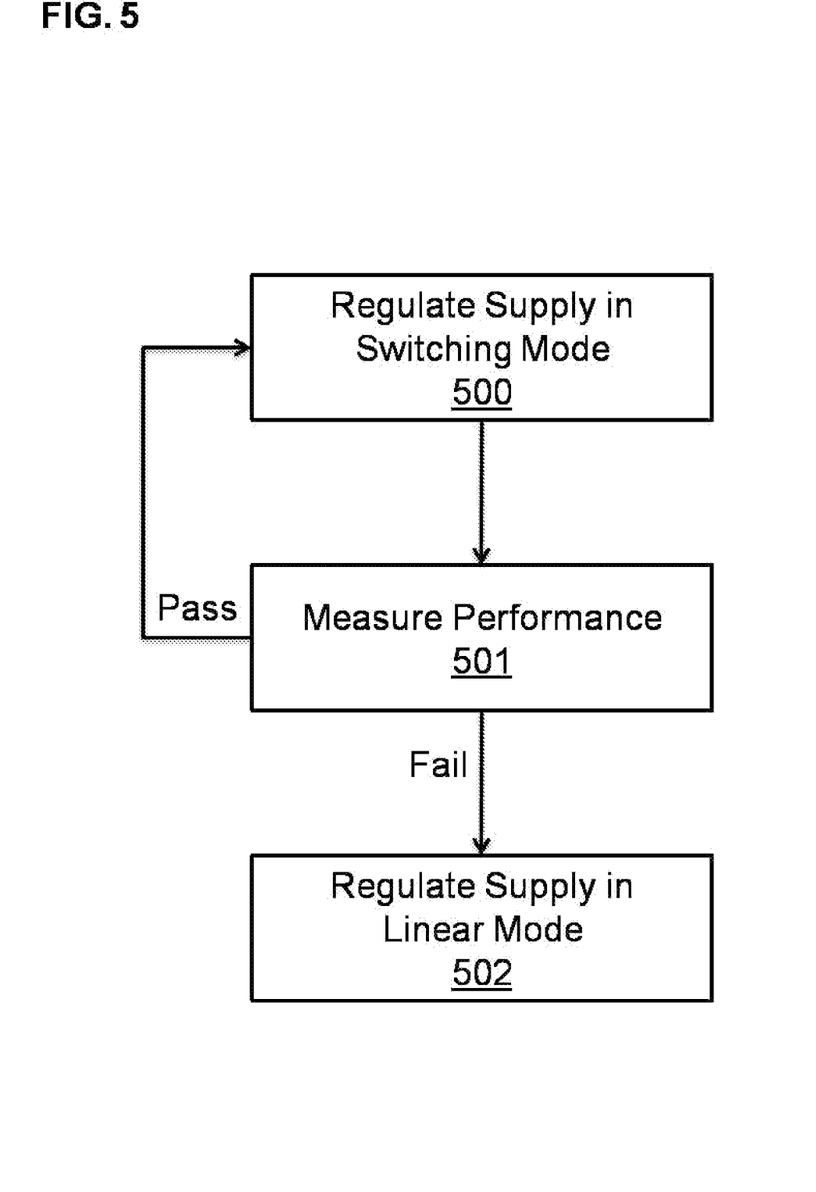
FIG. 5 illustrates a method for efficiently regulating a voltage using periodic monitoring of device performance parameters that is consistent with the present invention.

The embodiment of the present invention described with reference to FIG. 5 could be modified in several ways. For example, the pre-defined thresholds could be stored in programmable memory and set after the device was constructed and tested. These thresholds could alternatively be determined during design and could be hard coded into the logic of the device as it was constructed. Also, the control circuitry could periodically switch the regulator back into the switching mode and recheck the performance of the regulator and the device. If it was determined that the device could operate in the switching mode with sufficient performance the regulator would remain in the switching mode. In reference to FIG. 5, this would be equivalent to periodically moving from step 502 back to 500.

Figure 6:
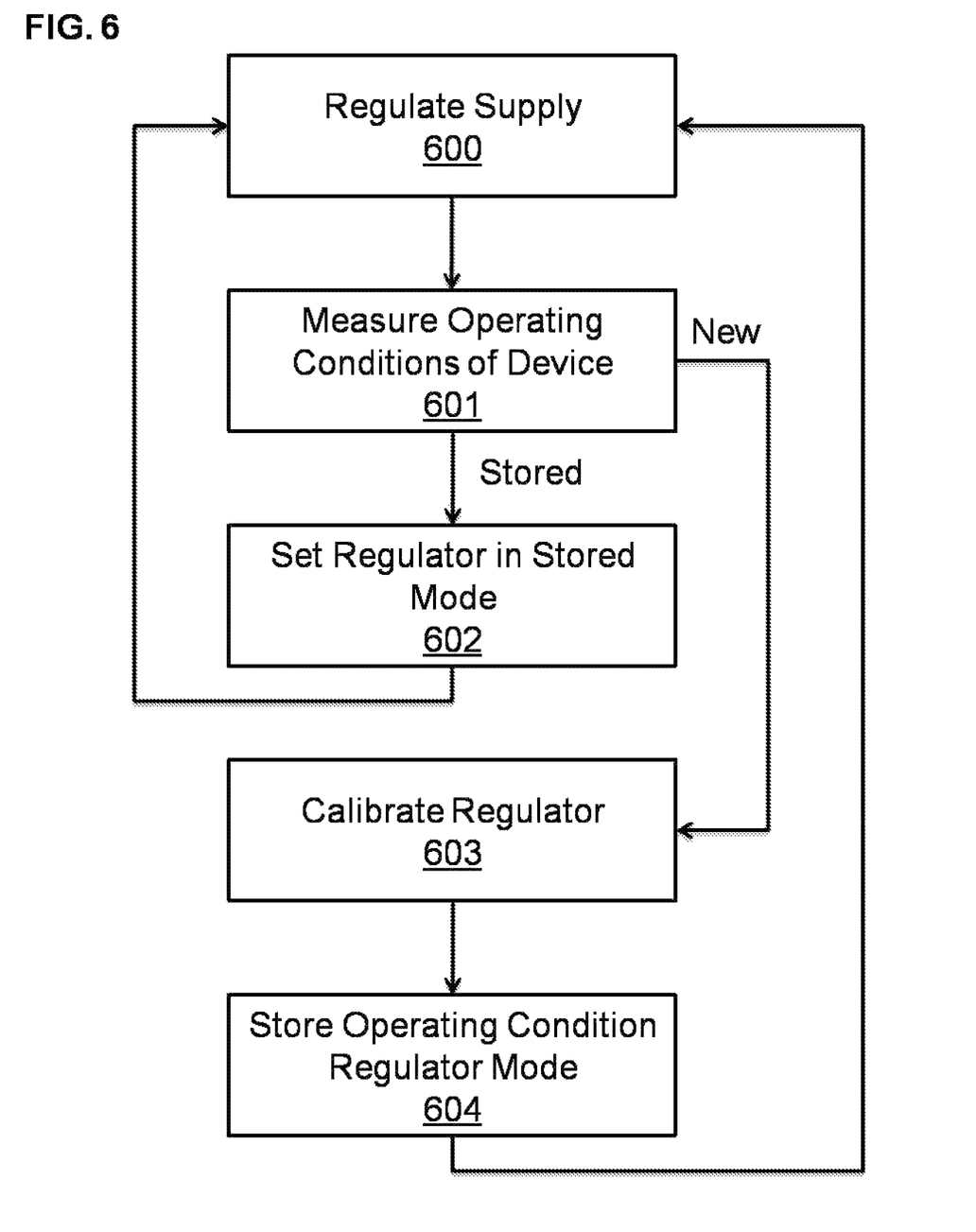
FIG. 6 illustrates a method for efficiently regulating a voltage using an operating condition storage matrix that is consistent with the present invention.

Another embodiment of the invention can be described with reference to the flowchart illustrated in FIG. 6. This particular embodiment is similar to that as described with reference to FIG. 5 except that the circuit in this embodiment forms a relationship between the operating conditions of the device and the performance parameters of the circuit to assist the regulator mode selection process. The performance parameters of interest may be similar to those as discussed in reference to FIG. 5. In step 600, the regulator will be regulating the device in either a switching or linear regulator mode. At periodic time periods with the same general characteristics as those described with reference to FIG. 5 the regulator will transfer to step 601.

In step 601, the regulator will measure the operating conditions of the device. The operating conditions of the device can be of two general categories. The first category includes all exogenous conditions in which the circuit is operating such as the ambient temperature, the temperature of the device, and the supply voltage. For example, a regulator operating on a cell phone IC could measure the cell phone's battery voltage and temperature. The second category of operating conditions includes the operational state of the device such as the mode in which the device is operating, the power consumption of the device, and the gain of a power amplifier if the device is a transmitter device. Any number of operational states could be considered so long as a given performance metric besides power consumption could be measured for such state. For example, a regulator could determine whether the device it was regulating was in a transmitting or receiving state. The control circuit could determine the operational states by either receiving the control signals of the device itself or measuring certain voltages or currents along the device's signal and bias paths.

After detecting the operating conditions, the circuit will compare the recently detected condition to conditions stored in an operating conditions storage matrix. If the operating conditions are not found in the stored matrix the circuit will move to step 603 and calibrate the regulator. Calibration can be done by operating the regulator in the switching mode, measuring the performance parameters, and determining if the performance parameters meet a specific threshold. If the threshold is met, the recently detected operating conditions could be stored in the operating conditions storage matrix along with a code indicating that the switching regulator mode should be applied when said operating conditions are encountered. If the threshold for performance parameters is not met, the operating conditions under analysis could be stored in the operating conditions storage matrix with a code for the linear regulator mode. Alternatively, calibration in step 603 could include measuring the performance parameters in both the linear and switching regulator modes and selecting the operational mode that provides the best performance-efficiency tradeoff. It is possible, for example, that the linear regulator will have superior performance parameters but that its performance advantage will not justify the associated excess power consumption. Regardless of the method of calibration, the storing that occurs in step 604 will be followed by returning to regulating the supply in step 600. In one embodiment, the regulator will be operating in the mode that was just stored in step 604 when returning to step 600.

The circuit can follow a different path from step 601 in certain circumstances. The circuit will take another course of action if the measured operating conditions are detected in the operating condition storage matrix. If the circuit has previously been through an iteration of steps 603 and 604 and stored the operating conditions coincident with that iteration, the circuit will already know what the optimal regulator mode is for the current situation. The circuit will therefore move to step 602 wherein the stored regulator mode code will be read and the regulator will be placed in the corresponding mode. The action of step 601 and 602 can be explained with the example of a cell phone transmitter IC. If the circuit determined on a previous iteration of 603 and 604 that the regulator needed to be in the linear mode when the transmitter was transmitting information, and the circuit determines in step 601 that the device is transmitting, the circuit will automatically put the regulator into the linear mode by moving to step 602 without having to calibrate the circuit.

In an alternative embodiment, the operating condition to regulator mode relationship would be rechecked periodically. This rechecking could be done in several different ways such as after the circuit detects a given operating condition in step 601 a certain number of times. The purpose of this rechecking would be to make sure that the performance was still acceptable given the fact that a circuit's behavior can change with time. Also, if the performance parameters came out differently on a subsequent measurement it might indicate that the operating conditions under review were border-line and should be regulated with the stable output regulator.

The development of the operating condition to regulator mode relationship could be done after the device was manufactured and deployed in an on-line manner. As such, the operating conditions could be stored in reprogrammable non-volatile memory or other types of more permanent memory. Alternatively, the relationship could be developed after the circuit had been manufactured but before the circuit was placed in operation such as when the circuit was under test by the manufacturer. The advantage of such an implementation would be that the circuit would not have to measure performance and operating conditions with as great a degree of accuracy since the testing environment could be regulated and the device performance could be measured with precision by testing equipment. In such an embodiment, the operating conditions storage matrix would probably be stored in one time programmable memory to save space. Finally, certain parameters of the operating condition storage matrix could be hard-coded into read-only memory (ROM) during fabrication. In the case of a radio device it may be determined during lab characterization that the linear regulator mode should always be applied when the device is transmitting to limit output spurs. In such a situation the operating condition storage matrix would be hard coded so that anytime the circuit was transmitting the linear regulator mode was applied.

Figure 4:
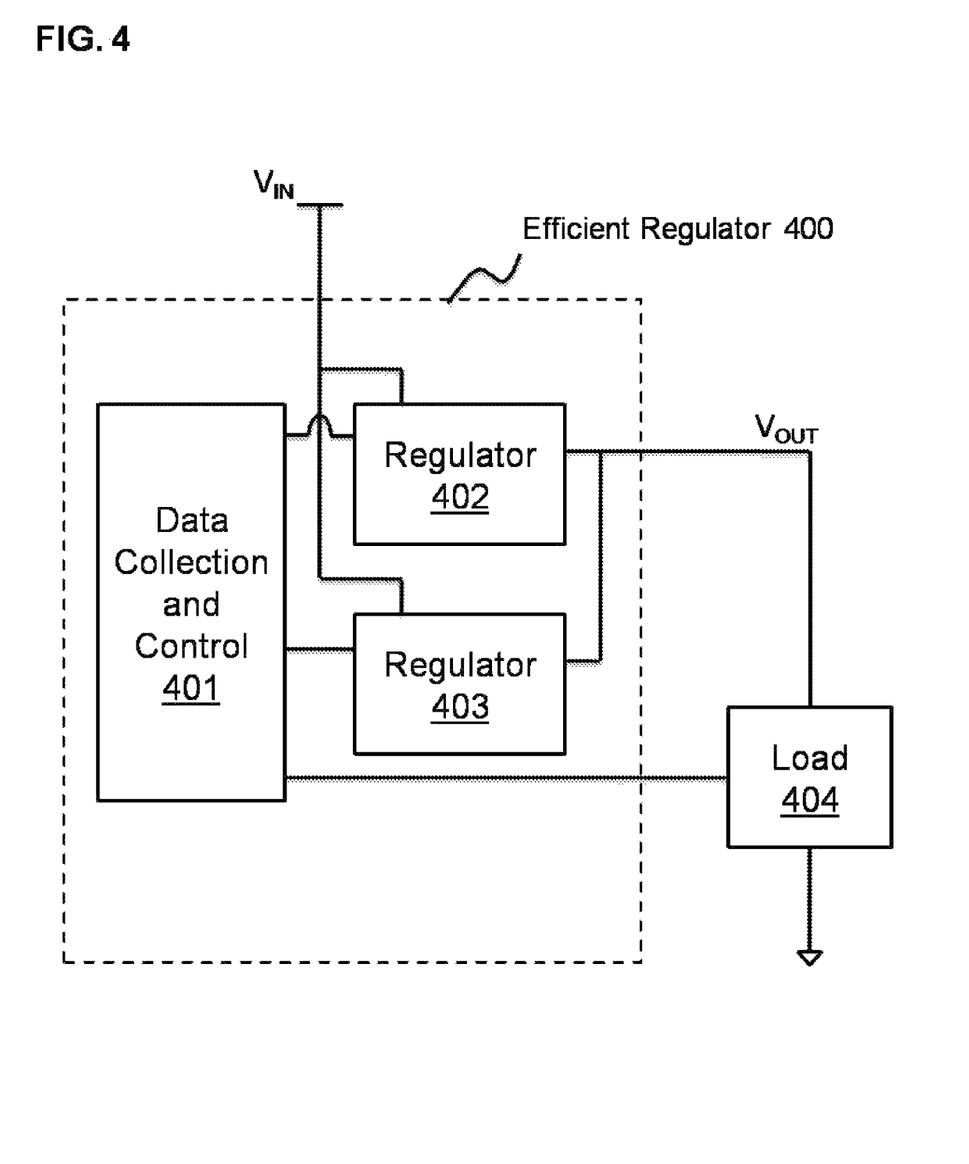
FIG. 4 illustrates an embodiment of the present invention utilizing separate regulator circuits.

The discussion of the prior art in regards to the step-down linear regulator and buck switching regulator as well as the discussion in reference to FIG. 4 where a two regulator solution is mentioned are not meant to limit the invention. The invention will function regardless of the choice of pass element for the linear regulator. Although the pass element in FIG. 1 is a p-type metal oxide semiconductor (PMOS) an n-type metal oxide semiconductor (NMOS) transistor or a bipolar junction transistor (BJT) could be used instead. Also, the regulator could be a step-down or negative regulator. The switching regulator could take many different forms as well and could still be compatible with the present invention. Likewise, the number of regulators applied could be increased so that different performance and power consumption nodes could be available to the system. Indeed, the regulators do not even need to be switching and linear regulators as long as their alternate selection provides greater flexibility in providing performance and power consumption options to the circuit.

Although embodiments of the invention have been discussed primarily with respect to specific embodiments thereof, other variations are possible. Various configurations of input and output circuits may be used in place of, or in addition to, the circuit configurations presented herein. The invention is not limited to use with silicon and can be applied to any semiconductor material including compound semiconductors. Functions may be performed by hardware or software, as desired. In general, any circuit diagrams presented are only intended to indicate one possible configuration, and many variations are possible. Those skilled in the art will also appreciate that methods and systems consistent with the present invention are suitable for use in a wide range of applications encompassing any involving voltage regulation of devices where power consumption is an issue. While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims. Furthermore, those skilled in the art will appreciate that the foregoing description is by way of example only, and is not intended to limit the invention.

What is claimed is:

1. A voltage regulator with dynamic mode selection for providing efficient voltage regulation to an electronic device, comprising:
    a first voltage regulator coupled to said electronic device and a power supply;
    a second voltage regulator coupled to said electronic device and said power supply; and
    a data collection and control circuit capable of measuring operating conditions and performance parameters of said electronic device;
    wherein said data collection and control circuit enables said first voltage regulator if said operating conditions are such that when said data collection and control circuit enables said second voltage regulator said performance parameters fall below a predefined standard.

2. The voltage regulator with dynamic mode selection for providing efficient voltage regulation to an electronic device in claim 1;
    wherein said first voltage regulator functions as a linear voltage regulator and regulates the output voltage at said output terminal when said data collection and control circuit enables said second regulator; and
    wherein said second voltage regulator functions as a switching voltage regulator and regulates said output voltage at said output terminal when receiving said enable signal on said second control input.

3. The voltage regulator with dynamic mode selection for providing efficient voltage regulation to an electronic device in claim 2 wherein, said data collection and control circuit is capable of storing said operating conditions corresponding to those when said performance parameters fall below said predefined standard in an operating conditions storage matrix.

4. The voltage regulator with dynamic mode selection for providing efficient voltage regulation to an electronic device in claim 3 wherein, said data collection and control circuit enables only one of said first regulator and said second regulator at a time.

5. The voltage regulator with dynamic mode selection for providing efficient voltage regulation to an electronic device in claim 4 wherein, said operating conditions include temperature and the supply voltage of said power supply.

6. The voltage regulator with dynamic mode selection for providing efficient voltage regulation to an electronic device in claim 2 wherein, said first voltage regulator and said second voltage regulator utilize the same pass element.

7. The voltage regulator with dynamic mode selection for providing efficient voltage regulation to an electronic device in claim 2 wherein, said operating conditions include temperature, the supply voltage of said power supply, and gain.

8. The voltage regulator with dynamic mode selection for providing efficient voltage regulation to an electronic device in claim 2 wherein, said operating conditions include device control inputs.

9. The voltage regulator with dynamic mode selection for providing efficient voltage regulation to an electronic device in claim 8 wherein, said device control inputs are a transmission mode signal and a receiver mode signal.

10. The voltage regulator with dynamic mode selection for providing efficient voltage regulation to an electronic device in claim 2 wherein, said performance parameters include transmission error rate.

11. The voltage regulator with dynamic mode selection for providing efficient voltage regulation to an electronic device in claim 2 wherein, said first regulator has a set of first multiple regulator outputs coupled to said first regulator output and said second regulator has a set of second multiple regulator outputs coupled to said second regulator output.

12. A method for providing efficient voltage regulation to an electronic device, comprising the steps of:
    regulating a supply voltage applied to said electronic device using a voltage regulator in a switching regulator mode;
    measuring performance parameters of said electronic device with a data collection and control circuit while said electronic device is in an operating state;
    switching said voltage regulator to a linear regulator mode for regulating said supply voltage applied to said electronic device if said performance parameters fail a predefined standard; and
    maintaining said voltage regulator in said switching regulator mode if said performance parameters exceed said predefined standard.

13. The method of providing efficient voltage regulation to an electronic device in claim 12, comprising the additional step of:

reverting to said switching regulator mode at predetermined periodic intervals if said voltage regulator is operating in said linear regulator mode.

14. A method for providing power optimized voltage regulation to an electronic device, comprising the steps of:

regulating a supply voltage applied to said electronic device with a voltage regulator in one of a linear regulator mode and a switching regulator mode;

measuring the operating conditions of said electronic device;

setting said voltage regulator in a stored mode corresponding to said operating conditions if said operating conditions and said stored mode are stored in an operating condition storage matrix;

calibrating said voltage regulator if said operating conditions are not stored in said operating condition storage matrix by measuring performance parameters of said electronic device while said voltage regulator is in said switching regulator mode; and storing, if said operating conditions are not stored in said operating condition storage matrix, a switching regulator mode selection code as said stored mode corresponding to said operating conditions if said performance parameters pass a predefined standard and a linear regulator mode selection code as said stored mode corresponding to said operating conditions if said performance parameters fail said predefined standard.

15. The method for providing efficient voltage regulation to an electronic device in claim 14 wherein, said measuring takes place at predetermined periodic intervals.

16. The method for providing efficient voltage regulation to an electronic device in claim 14 further comprising the step of:

setting said electronic device into an operating condition of interest using testing equipment before said measuring.

17. The method for providing efficient voltage regulation to an electronic device in claim 14 further comprising the steps of:

rechecking, at periodic intervals, said performance parameters of said electronic device while said voltage regulator is in said switching regulator mode; and replacing, if said operating conditions are stored in said operating conditions storage matrix, said switching regulator mode selection code with said linear regulator mode selection code as said stored mode corresponding to said operating conditions if said performance parameters fail said predefined standard.

18. The method for providing efficient voltage regulation to an electronic device in claim 14 wherein, a vector of said operating condition storage matrix corresponding to the transmit or receive state of said electronic device is one of hard coded into the logic of said voltage regulator and programmed into a non-volatile memory of said voltage regulator.

19. The method of providing efficient voltage regulation to an electronic device in claim 14 wherein, said stored mode can be a linear regulator mode that provides a single linear regulator output to said electronic devices and a switching regulator mode that provides a single switching regulator output to said electronic device.

20. The method of providing efficient voltage regulation to an electronic device in claim 14 wherein, said voltage regulator applies multiple switching regulator outputs to said electronic device during said switching regulator mode and provides at least one linear regulator output to said electronic device during said linear regulator mode.

\* \* \* \* \*